(12) United States Patent
Rigollet et al.

(10) Patent No.: US 11,536,401 B2
(45) Date of Patent: Dec. 27, 2022

(54) CLAMPING DEVICE COMPRISING A COLLAR AND A SEAL

(71) Applicant: CAILLAU, Issy-les-Moulineaux (FR)

(72) Inventors: Nicolas Rigollet, Romorantin-Lanthenay (FR); Christophe Chagnon, Contres (FR)

( * ) Notice: Subject to any disclaimer, the term of this patent is extended or adjusted under 35 U.S.C. 154(b) by 140 days.

(21) Appl. No.: 16/861,247

(22) Filed: Apr. 29, 2020

(65) Prior Publication Data

US 2020/0347967 A1 Nov. 5, 2020

(30) Foreign Application Priority Data

May 3, 2019 (FR) ..................... 19 04673

(51) Int. Cl.
*F16L 21/06* (2006.01)
*F16L 21/00* (2006.01)
*F16L 59/18* (2006.01)

(52) U.S. Cl.
CPC .......... *F16L 21/005* (2013.01); *F16L 21/065* (2013.01); *F16L 59/184* (2013.01)

(58) Field of Classification Search
CPC ....... F16L 21/005; F16L 21/022; F16L 21/06; F16L 21/065; F16L 25/04; F16L 25/06; F16L 25/08; F16L 33/04; F16L 33/06; F16L 33/10; F16L 33/18
USPC ................. 285/337, 372, 373, 379, 252, 253
See application file for complete search history.

(56) References Cited

U.S. PATENT DOCUMENTS

| | | | |
|---|---|---|---|
| 6,199,921 B1 | 3/2001 | Cassel et al. | |
| 6,398,267 B1 | 6/2002 | Detable et al. | |
| 9,016,731 B2 | 4/2015 | Rigollet | |
| 10,612,705 B2 | 4/2020 | Prevot et al. | |
| 2011/0018263 A1 | 1/2011 | Ignaczak | |

FOREIGN PATENT DOCUMENTS

| | | |
|---|---|---|
| EP | 1181477 A1 | 2/2002 |
| EP | 1816325 A1 | 8/2007 |
| EP | 1875116 A1 | 1/2008 |
| EP | 2598785 A1 | 6/2013 |
| EP | 3232107 A1 | 10/2017 |
| WO | WO2006/109002 | * 10/2006 |

OTHER PUBLICATIONS

Translation WO2006/109002 (Year: 2006).*
English language abstract of EP 1875116.

* cited by examiner

*Primary Examiner* — Aaron M Dunwoody
(74) *Attorney, Agent, or Firm* — Robert Facey

(57) ABSTRACT

A clamping device including a collar which has a belt able to be clamped by the reduction of its diameter and a seal disposed inside the belt by being retained axially relative to the collar. The seal is formed in a strip which is wound on itself and whose ends are configured to cooperate together via a sealing arrangement. The seal undergoes a stress towards the inner surface of the belt and is configured to be elastically deformed against the stress to allow the insertion of an annular object between the seal and the belt.

18 Claims, 6 Drawing Sheets

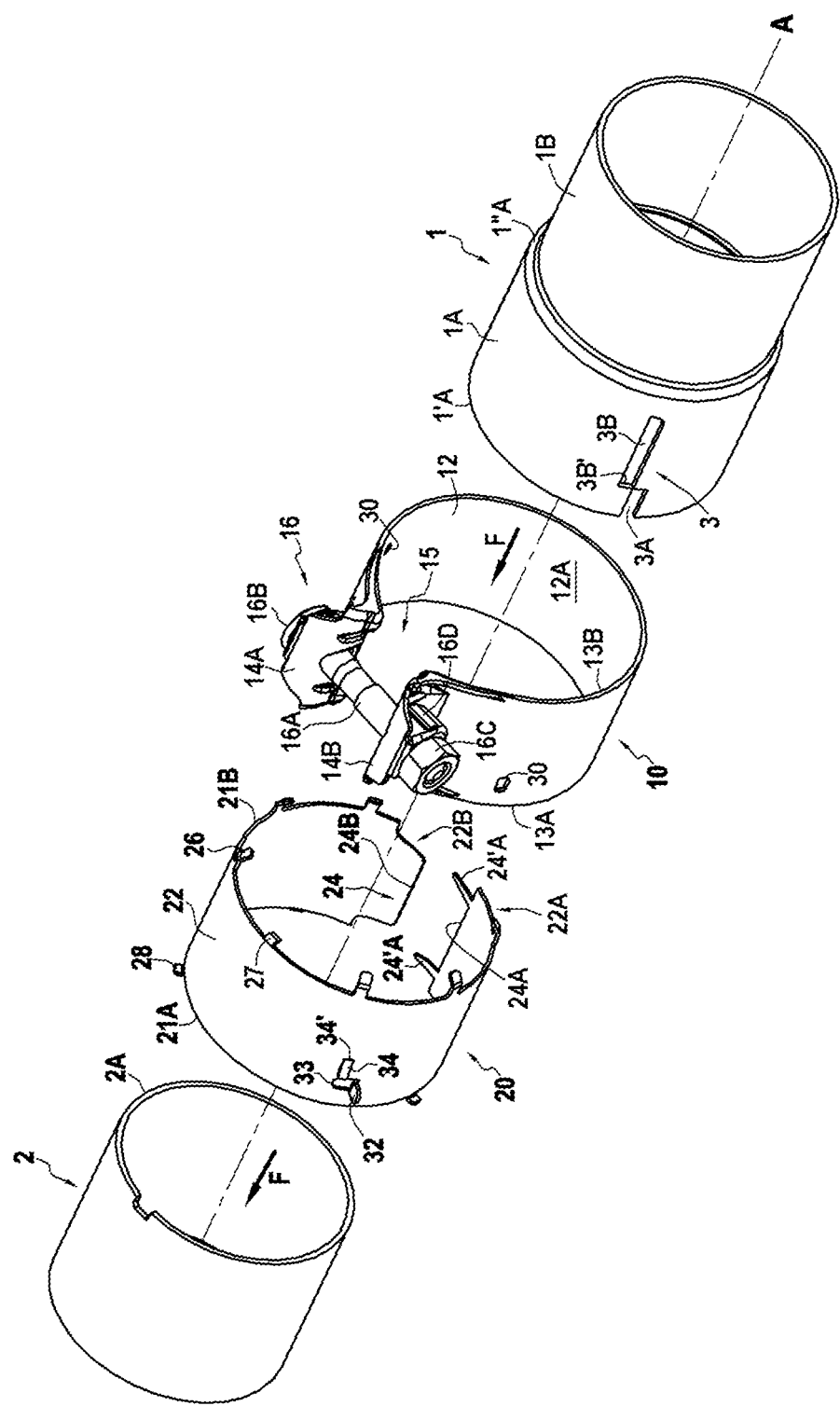
[Fig. 1]

[Fig. 2]
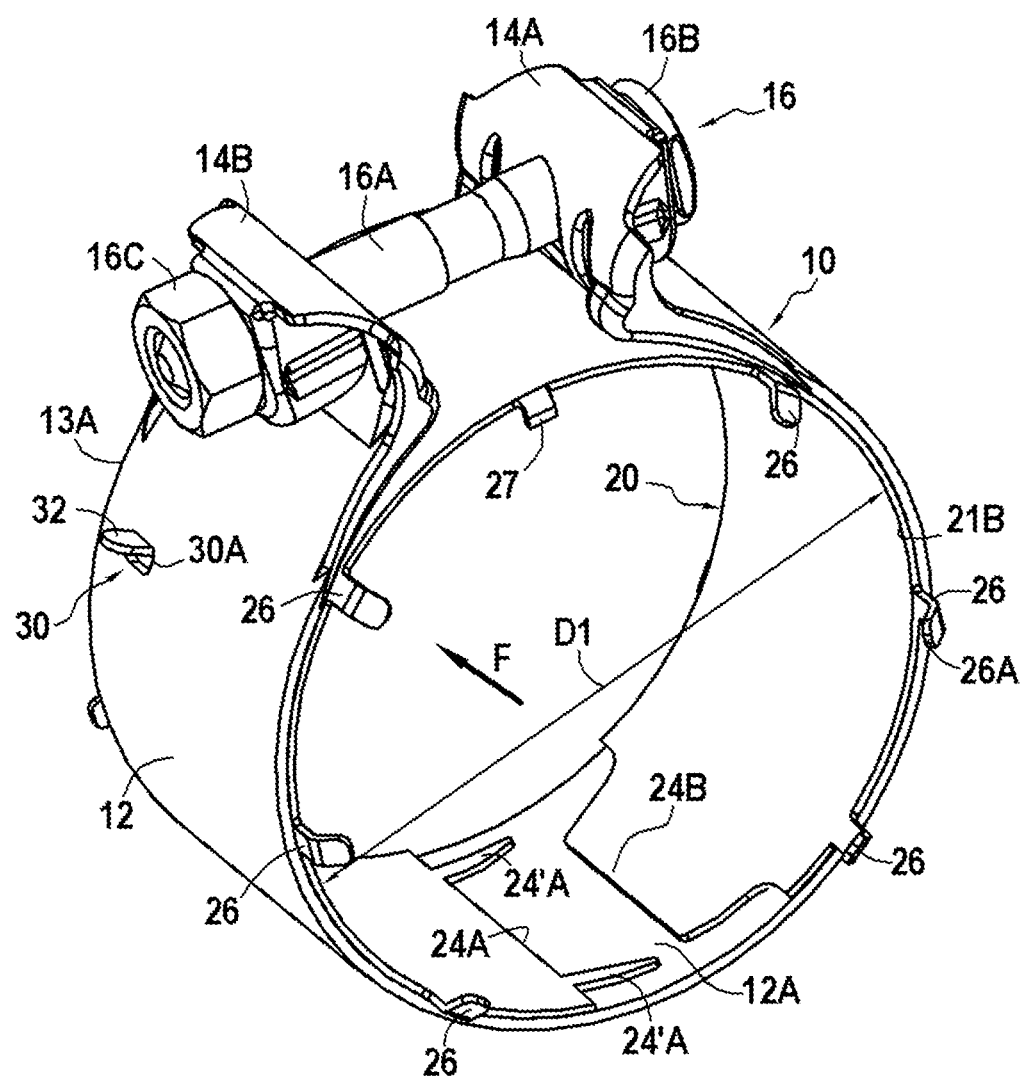

[Fig. 3]
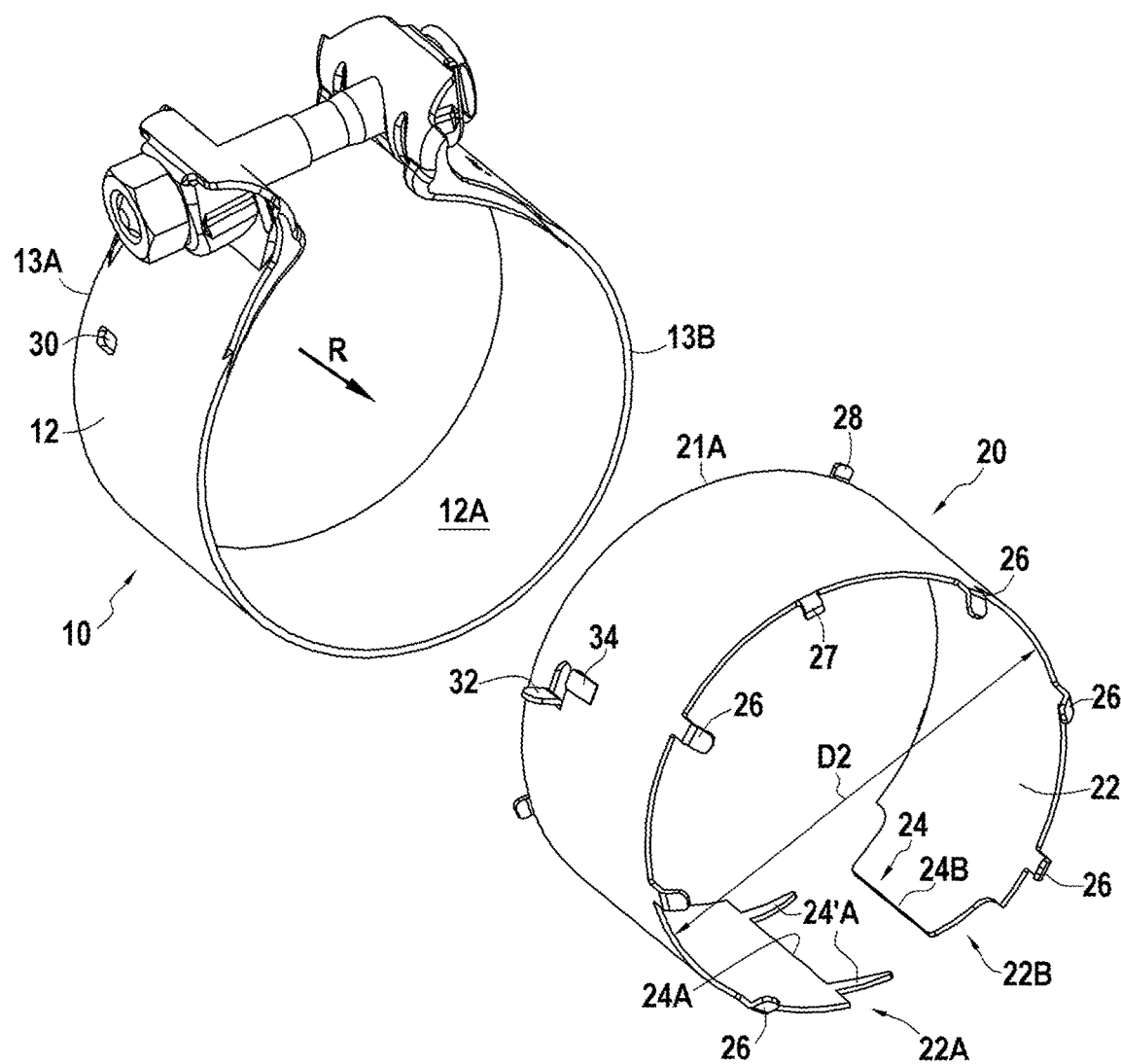

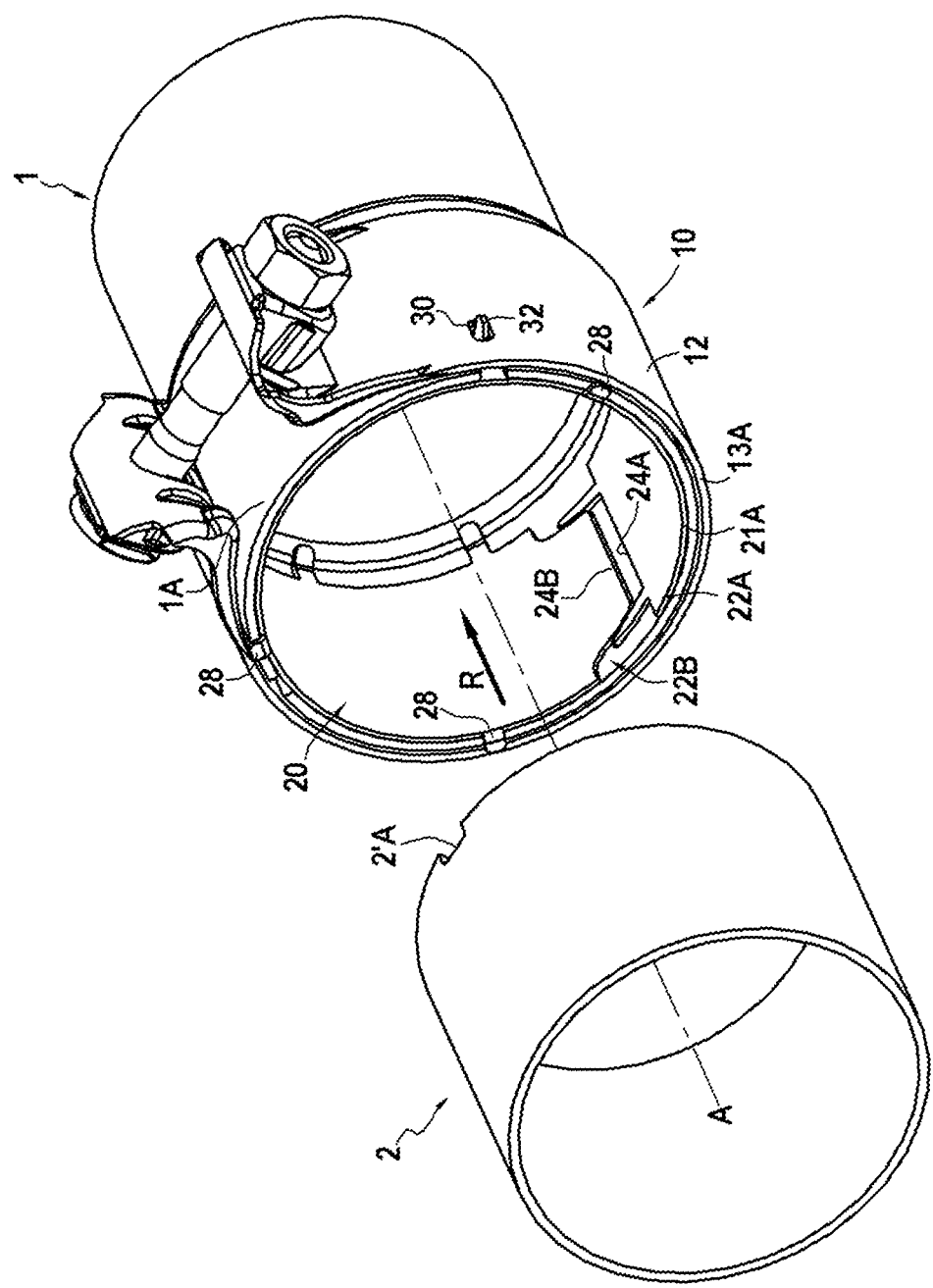
[Fig. 4]

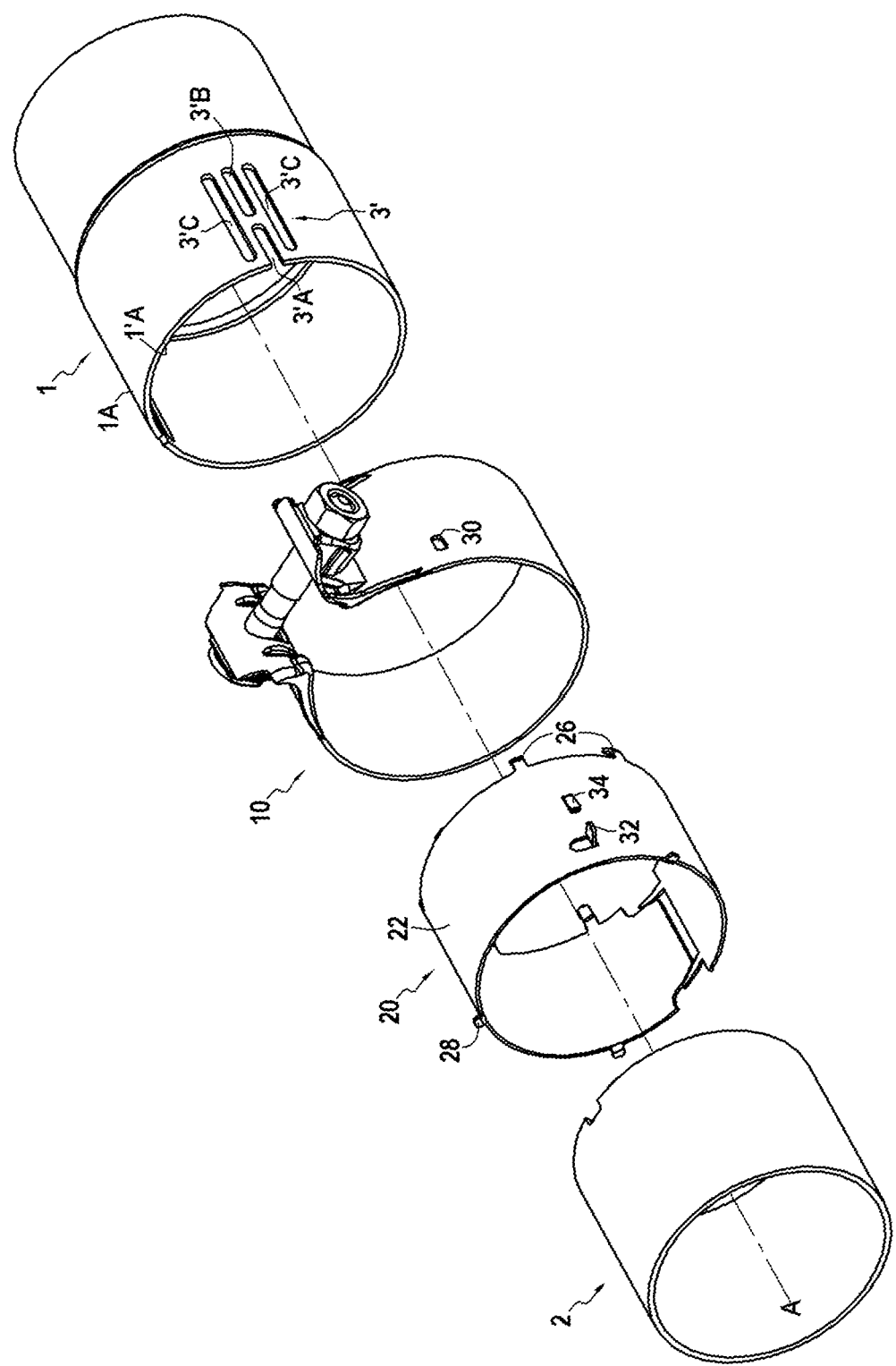
[Fig. 5]

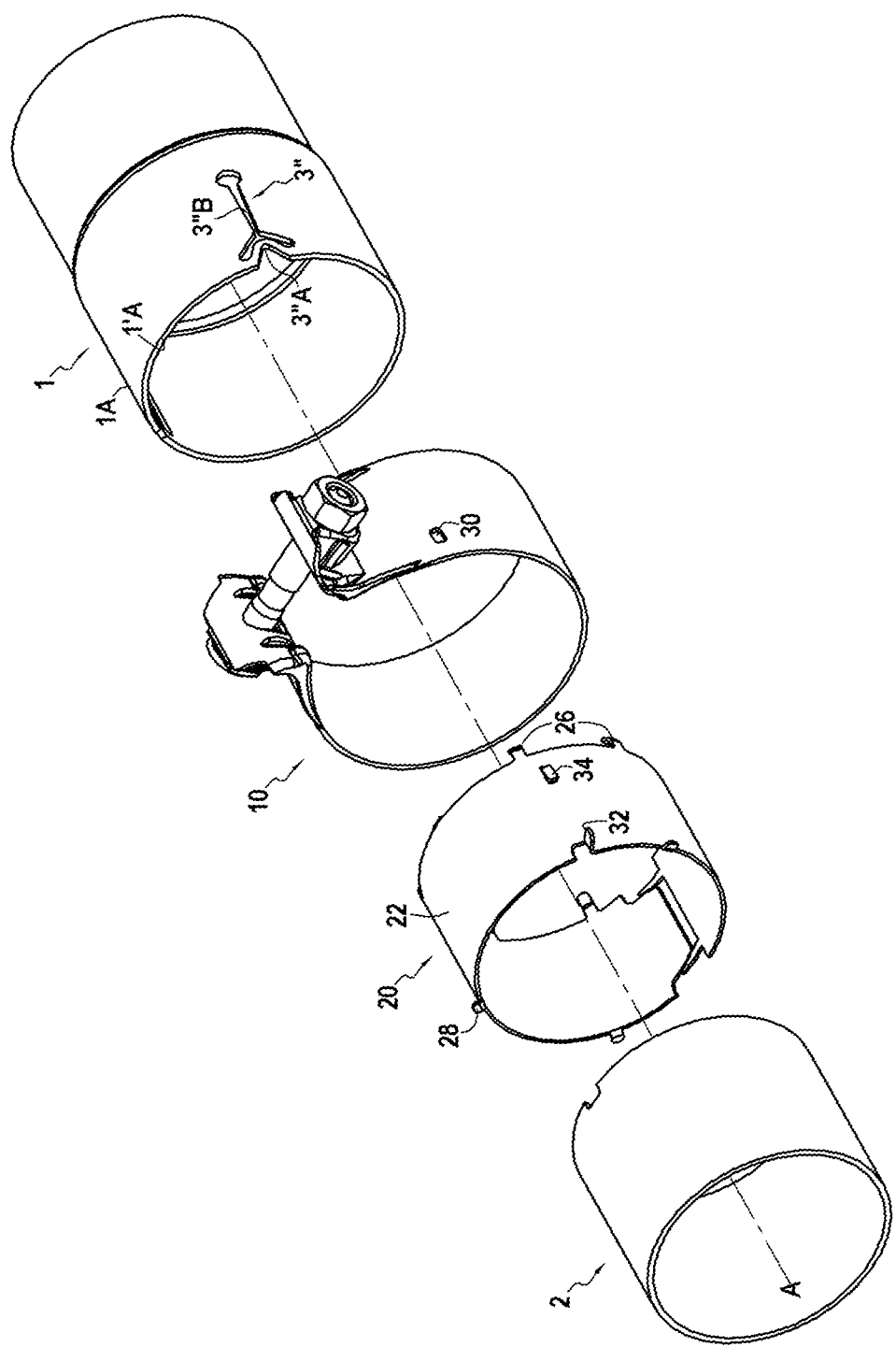
[Fig. 6]

CLAMPING DEVICE COMPRISING A COLLAR AND A SEAL

TECHNICAL FIELD

The present disclosure relates to a clamping device comprising a collar. It particularly relates to a device used to clamp a tube by means of a collar. It particularly involves connecting two tubes fitted together, the collar being clamped on the end of the external tube which is fitted on the internal tube.

BACKGROUND

Patent U.S. Pat. No. 6,199,921 discloses a clamping device for two tubes fitted together, the external tube having a cutout promoting its deformation during the clamping. Thus, the sealing of the connection between the two tubes is obtained by the fact that the external tube is deformed enough such that its inner periphery comes into intimate contact with the outer periphery of the internal tube, and that the cutout of the external tube promoting its deformation is correctly bridged by the clamping collar.

In order to sealingly connect two tubes fitted together, it is also possible to conceivable to have a seal at the interface between the two tubes, and to clamp the fitted tubes. For example, the seal may be disposed between the inner periphery of the external tube and the outer periphery of the internal tube. However, placing such a seal and holding it in position during the clamping can be delicate, thereby complicating the operations of fitting and clamping the tubes.

In order to overcome these drawbacks, patents EP 2 598 785 and EP 3 232 107 propose a system in which the seal is pre-mounted in the collar which is used to clamp the fitting of the tubes. More specifically, this system comprises a washer which comprises a closed annular portion forming the seal and lugs connecting this seal to the collar. The annular seal is initially maintained at a significant distance from the inner periphery of the collar so as to allow the engagement of the outer tube between the seal and this inner periphery. Then, the inner tube is in turn engaged so as to come into contact with the seal. This device is particularly adapted to clamp two tubes fitted together and having radially protruding flared surfaces serving as a bearing for a clamping collar which comprises a recess which can house these radially protruding flared surfaces, the closed annular seal having itself a frustoconical shape adapted to these flared surfaces.

The patent application US 2011/0018263 discloses a clamping device for connecting two tubes. This device comprises a collar and a seal intended to be located between the two connected tubes. For this, the seal is pre-mounted on the end of one of the tubes, particularly by adhesive. The clamping device therefore cannot be presented as a whole, comprising the collar and the seal, which can be mounted on the tubes to connect them. In other words, in this device, the seal cannot be pre-mounted in the belt.

Patent application EP 1 816 325 also discloses a clamping device comprising a collar and a seal, in which this seal is not pre-mounted in the belt.

DISCLOSURE

There is a need to improve the state of the art, in particular by proposing a device comprising a seal pre-mounted in the collar, generally adapted to clamp tubes fitted together, even if these tubes do not have a radial flared shape.

The disclosure aims at proposing a clamping device which at least substantially overcomes the aforementioned drawbacks.

Thus, the disclosure relates to a clamping device comprising a collar which has a belt able to adopt an unclamped state and a clamped state in which its diameter is reduced compared to the unclamped state, and a seal disposed inside the belt by being retained axially relative to the collar, the seal being formed in a strip, which is wound on itself and whose ends are configured to cooperate together via a sealing arrangement, wherein, in the unclamped state of the belt, the pre-mounted seal disposed inside the belt undergoes a stress towards the inner surface of the belt, the seal being configured to be elastically deformed against this stress to allow the insertion of an annular object between the seal and the belt.

Optionally, the pre-mounted seal is pre-stressed by the presence, around said seal, of the belt in the unclamped state.

Optionally, the stress of the seal towards the inner surface of the belt is caused by the tendency of the strip to adopt a diameter greater than the diameter imposed by the belt in which it is disposed while the belt is in the unclamped state.

Optionally, the seal has a rear edge which is provided with at least one insertion ramp inclined towards the axis of winding of the strip in the direction moving away axially from the seal from said rear edge, said ramp being optionally formed by a lug whose free end is bent inwardly.

Optionally, the device comprises an angular seal key configured to determine an angular position of the seal relative to the collar.

Optionally, one of the elements formed by the belt and the seal has a wedge edge and the other element has a wedge protrusion able to cooperate with the wedge edge to retain the seal with respect to a movement relative to the collar.

Optionally, the seal has a front edge provided with at least one abutment configured to cooperate with the front edge of the belt to retain the seal with respect to a movement in at least one direction relative to the belt, the abutment comprising optionally a lug bent outwardly.

Optionally, the belt has a window whose edge forms a wedge edge, and the seal has a retaining lug projecting in this window.

Optionally, the sealing arrangement comprises a male/female engagement conformation formed at the ends of the strip forming the seal.

Optionally, the belt and the seal have substantially unchanged diameters from one edge to the other.

Optionally, the collar has clamping lugs, raised radially relative to the belt and able to be moved relative to each other to clamp the collar.

The disclosure also relates to a tube clamping assembly, comprising a clamping device of the aforementioned type and a tube whose end is able to be inserted between the seal and the belt.

Optionally, the assembly comprises a tube position key determining an angular position of the tube relative to at least one of the elements comprising the seal and the collar.

Optionally, the seal has a tube position key lug which radially protrudes outwardly from the seal and which is configured to be engaged in a slot formed at the end of the tube.

Optionally, the seal comprises an anti-extraction member, particularly an anti-extraction tab, configured to cooperate with a window of the tube to oppose the extraction of the seal from the tube.

The disclosure will be well understood and its object will appear better upon reading the following detailed description of one embodiment and its variants, represented by way of non-limiting examples.

BRIEF DESCRIPTION OF THE DRAWINGS

FIG. 1 shows in an exploded perspective view a tube clamping assembly comprising a clamping device according to the present disclosure.

FIG. 2 is a perspective view of the clamping device comprising a collar and a seal.

FIG. 3 shows the clamping device of FIG. 2 in the state in which the seal is not disposed in the belt of the collar.

FIG. 4 is a perspective view showing the clamping device of the previous figures mounted at the end of an outer tube, before fitting an inner tube into the outer tube.

FIG. 5 is a view similar to FIG. 1, for a variant.

FIG. 6 is a view similar to FIGS. 1 and 5 for another variant.

DESCRIPTION OF THE EMBODIMENTS

The assembly represented in FIG. 1 comprises a clamping device which itself comprises a collar 10 and a seal 20. This assembly also comprises an outer tube 1 and an inner tube 2. The inner tube 2 is configured to be fitted into the outer tube 1 to connect the two tubes. More specifically, the inner tube 2 is fitted into the end 1A of the outer tube 1, around which the clamping collar 10 is then placed to clamp the assembly thus made. In this assembled situation, the seal 20 is itself disposed between the inner and outer tubes. For the fitting, it is understood that the seal 20 is placed in the end 1A of the tube 1 around which the clamping collar 10 is disposed, and the inner tube 2 is fitted into the seal 20.

In this case, the portions of the two tubes 1 and 2 fitted into each other form cylindrical surfaces without bulge. The end 1A of the tube 1 is however delimited, on the side opposite to its free end VA, by a shoulder 1"A. The end 1A is thus widened, while the remaining portion 1B of the tube 1 has a similar diameter to that of the tube 2.

It is noted that the seal 20 is formed in a strip 22 which is wound on itself and whose ends respectively 22A and 22B cooperate together via a sealing arrangement 24. In this case, this sealing arrangement comprises a notch 24A formed at the end 22A and delimited between deformable edges 24'A, as well as a tab 24B formed at the end 22B. The edges 24'A are slightly inclined so that the width of the notch 24A gradually increases towards the free end of the end 22A. Similarly, the width of the tab 24B gradually increases while moving away from the free end of the end 22B. Thus, the more the tab 24B penetrates into the notch 24, the more the contact between the edges of the tab and the edges of the notch is stressed, until causing slight deformations of the edges of the notch. The contact areas between the tab and the edges of the notch thus form sealing contacts. In this case, the edges of the notch 24A are formed on deformable lugs.

This is an example of a sealing arrangement allowing cooperation between the ends 22A and 22B of the strip 22 forming the seal 20. Other sealing arrangements can be provided, whether they are as in this case provided directly on the strip 22, in one piece therewith, or added, for example in a more deformable material. The sealing can also be obtained by a baffle effect without necessarily implementing the contact and deformation stresses mentioned above.

Anyway, the seal 20 is of the open type, that is to say the ends of the strip 22 in which it is formed can move relative to each other to increase or decrease the diameter of this seal. In this case, the seal 24 is formed in one piece in the strip 22, so that it can be considered that it is formed by the strip wound on itself and having the various cutouts and lugs which will be described below. Particularly, the strip 22 is metallic, particularly in a material of the stainless steel type. The strip 22 can be made of a single material, or have several materials, for example several layers or elementary strips disposed over each other. For example, the strip may comprise two similar elementary strips disposed over each other. Thus, the strip may comprise an elementary metal strip, supporting an elementary mica-based strip. The two elementary strips can be secured to each other by any suitable means, for example by bonding or the like, or even by mechanical means. Such mechanical means can be lugs of the elementary metal strip folded against the elementary mica-based strip or engaged in holes or notches of this elementary strip, to hold it against the elementary metal strip. For example, the elementary mica-based strip can be made of a material of a type known under the trademark Cogemica Hi-Temp® resisting to high temperatures and comprising, by mass, 90% of mica or more and 10% of binder or less.

Whatever its material, and in particular when it is made of metal, the strip 22 may have undergone a surface treatment, for example based on lamellar zinc, making it possible to constitute an outer layer promoting the sealing. Likewise, the collar 10 and, optionally, the tubes 1 and 2 may be metallic.

FIG. 2 will now be described, in which the seal 20 is disposed inside the belt 12 of the collar 10. This belt 12 defines a cylindrical shape and the seal 20 is disposed inside this cylinder. In FIG. 2, the seal 20 is pre-mounted in the belt, so that the collar and the pre-mounted seal form a component which can be brought to the end of a tube. More specifically, as can be seen in FIG. 4, the component formed by the collar and the pre-mounted seal can be brought to the end of a first tube 1 by inserting this end between the seal and the belt. It then suffices to fit a second tube 2 into the first tube 1 and then to clamp the belt, to sealingly connect the two tubes.

By comparing FIG. 2 to FIGS. 1 and 3, it can be seen that, in FIG. 2, the seal 20 is pre-stressed by the presence, around this seal, of the belt 12 of the collar. Indeed, in the free state, this seal 20 has a larger diameter than the one delimited by the belt of the collar. Thus, when the seal is in the collar, it is stressed by the inner surface 12A of the belt 12 to adopt a diameter smaller than the diameter it would have in the free state. In other words, the seal 20 is naturally pressed against the belt 12 of the collar 10. Being an open seal, the seal can behave like a spring, its diameter increasing and decreasing depending on whether the ends 22A or 22B of the strip 22 in which it is formed move closer to or away from each other.

While the clamping device is in the situation represented in FIG. 2, the seal 20 being pressed against the inner surface of the belt 12, an annular object, in this case the end 1A of the tube 1, can be introduced between the seal and the belt 12. For this, it suffices to bring closer to each other the ends of the strip 22 forming the seal so that the diameter of the latter is reduced, thus arranging between the seal and the belt an annular space allowing the insertion of the end 1A of the tube 1. In the present case, in order to promote this approach of the ends of the strip and therefore this reduction in the diameter of the seal, the seal 20 has a rear edge 21B which is provided with lugs 26 forming insertion ramps.

More specifically, each lug 26 extends axially towards the rear of the seal, its free end 26A being bent inwardly. Thus, the outer surface of the lug 26 forms a ramp on which the free end of the annular object can slide, in this case the end 1A of the tube 1, upon its insertion between the seal and the belt. Several angularly distributed lugs 26 can be provided. In this case, the seal includes six lugs 26.

Within the meaning of the present disclosure, the qualifiers "front" and "rear" are understood in relation to the direction of fitting of the tubes. Thus, the rear edge 21B of the seal 20 is its edge which, while this seal is disposed in the end 1A of the tube 1, is the furthest from the free end 1' (front end) of the tube 1 from which this tube 1 is fitted onto the tube 2. In contrast, the front edge 21A of the seal 20 is the one which is located closest to the free end 1'A of the tube when the seal is disposed in the tube 1. With regard to the tube 1, the shoulder 1"A previously mentioned is disposed at the rear of the free end VA. With regard to the tube 2, its free end 2A facing the tube 1 is its front end.

Furthermore, the elements which are disposed towards the axis of the tubes, of the collar and of the seal will be referred to as "internal". When the assembly is mounted, these various elements are concentric, their axes being coincident in the axis A.

When it is disposed inside the belt 12, the seal 20 is retained axially relative to the collar 10. In this case, several elements contribute to this axial retention. On the one hand, the front edge 13A of the belt forms a wedge edge against which wedge protrusions 28 formed on the seal 20 cooperate in abutment. These wedge protrusions 28 are in this case formed by radially raised lugs 28 formed on the front edge 21A of the seal 20. The free ends of these lugs are circumscribed in a circle of diameter greater than the inner diameter of the belt 12 in the unclamped state of the belt. Thus, the seal 20 can be disposed in the collar by engaging its rear edge in the collar, from the front edge (wedge edge) of the belt, until the lugs 28 abut against this wedge edge 13A.

Once the seal 20 is in place in the collar, this axial retention opposes the movement of the seal rearwardly relative to the collar that is to say in the direction R indicated in the FIGS. 3 and 4. Thus, once the clamping system is in place at the end 1A of the tube 1 as represented in FIG. 4, the tube 2 can be fitted into the seal 20 without pushing back the latter in the direction R.

Furthermore, as seen in particular in FIG. 2, the belt 12 has a window 30 whose edge 30A forms a wedge edge, and the seal has a radial protrusion engaged in this window. In this case, the radial protrusion is formed by a retaining lug 32 that the seal has, and which is bent so as to pass through the window 30 when the seal is mounted in the collar. Particularly, this lug 32 is cut out in the strip 22 forming the seal, a cutout 33 then remaining in the strip when the lug is bent.

In order to place the seal 20 in the collar 10, during the axial insertion mentioned above, it suffices to slightly compress the seal so that the free end of the bent lug 32 defines a diametrical dimension smaller than the diameter that the belt 12 has, it being recalled that the seal is inserted into the collar in the unclamped state of the belt.

In this case, it is seen that the belt 12 has two identical windows 30, disposed so that the one is found in place of the other when the collar is pivoted by 180 degrees so as to reverse the front 13A and rear 13B edges of the belt. Thus, whether the collar is in either of these two positions, the seal 20 can be correctly placed in the belt.

The window 30 and the lug 32 which have just been mentioned serve, on the one hand, to contribute to the axial retention of the seal relative to the collar. Indeed, when the lug is engaged in the window, the contact between the lug and the edge 30A of the window opposes the axial movements of the seal relative to the collar in the direction R and also in the opposite direction.

On the other hand, the window 30 and the lug 32 serve as an angular seal key since the correct engagement of the lug in the window determines the angular position of the seal relative to the belt. When, as in the example represented, the collar is of the open type, this allows ensuring that the ends of the strip 22 in which the seal is formed are disposed in a place other than the opening of the collar.

Returning to FIG. 1, it can be seen that the end 1A of the tube has a slot 3 which, in this case, comprises an open portion 3A, which is open on the free end 1A of the tube and a window portion 3B whose outline is closed or almost closed. Thus, the end 1A can be clamped on the tube 2A by reducing the diameter of the end 1A obtained by reducing the width of the slot 3. This slot 3 also makes it possible to contribute to the determination of the angular position of the tube relative to the clamping system. Indeed, the open portion 3A of the slot 3 can receive the aforementioned lug 32 of the seal 20 during the insertion of the portion 1A of the tube into the annular space formed between the tube and the belt 12. Thus, the lug 32 does not oppose the insertion of the tube 1 up to the desired position and, moreover, the cooperation between this lug 32 and the slot 3A determines the angular position of the tube relative to the seal and therefore relative to the collar since the angular position of the seal relative to the collar is itself determined.

The device according to the present disclosure also comprises an anti-extraction member for the seal relative to the tube 1. In this case, the seal 20 has an anti-extraction tab 34 which, in this case, is formed by a tab cut out in the strip 22 and slightly bent outwardly so that its free edge is located towards the front edge 21A of the seal 20, while its fold 34' for attachment to the current portion of the strip is located rearwardly. Under these conditions, it is understood that, during the engagement of the end 1A between the seal and the collar, the thrust of the end 1A in the forward direction F (see FIGS. 1 and 2) tends to push back the tab 34 inwardly. In other words, this tab 34 disappears upon insertion of the end 1A of the tube. However, this deformation of the tab is elastic, the latter then being able to recover its bent shape in the closed window portion 3B of the slot 3 of the tube. Thus, the cooperation between the tab 34 and the front edge 3B' of the window 3B opposes to the extraction of the seal from the tube in the direction F.

In FIG. 4, the end 1A of the tube 1 is inserted between the seal 20 and the inner periphery of the belt 12 of the collar. It is also seen that the tab 24B formed at the end 22B of the strip 22 in which the seal is formed has moved forward into the notch 24A formed at the end 22A of this same strip. Thus, the edges of the tab 24B cooperate with the edges 24'A of the notch 24A, so as to form sealed contact areas. Furthermore, the seal is retained in the collar and in the tube by the previously mentioned lugs 28 and 32, as well as by the lug 34 which, in FIG. 4, is hidden by the belt. In this situation, the end of the tube 2 can be inserted into the assembly formed by the tube 1, the collar 10 and the seal 20 being pre-mounted at the end 1A of this tube 1.

It is noted that the front edge 2A of the tube 2 has a notch 2'A. This notch can serve as an angular position key, by cooperating with a key lug 27 folded inwardly on the rear edge of the seal 20. This lug 27 differs from the lugs 26 previously mentioned in that it is folded inwardly closer to the rear edge 21B of the seal.

As indicated above, the clamping collar is of the open type. In this case, the belt carries clamping lugs respectively 14A and 14B which are bent radially outwardly and between which is defined a slot 15 defining the opening of the collar. These lugs can be moved relative to each other to clamp the collar. In this case, this movement is an approach movement, made by means of the clamping rod 16A. More specifically, the collar comprises a clamping screw 16, whose ends are retained at the rear of the clamping lugs 14A and 14B, in this case, respectively by the head 16B of the screw and a nut 16C, possibly via a spacer 16D. In the specific case of the clamping lugs 14A and 14B, the rear of a clamping lug is the side of this lug which is opposite the other clamping lug. Thanks to the previously mentioned angular key, on the one hand, the slot 3 of the tube 1 is angularly offset relative to the slot 15 of the collar 10 delimited between its clamping lugs and, on the other hand, the ends of the strip 22 in which the seal 20 is formed are also angularly offset relative to both the slot 3 of the tube and the slot 15 of the collar.

FIG. 5 is now described in which the same references as in the preceding figures are repeated, with the exception of those that relate to the slot of the tube 1. Indeed, in FIG. 5, this slot is designated by the reference 3' and is formed by several elementary axial slots, particularly a front slot 3'A open on the free edge 1'A of the tube, a closed slot 3'B located at the rear of this slot 3'A and closed lateral slots 3'C located on either side of the slots 3'A and 3'B. The clamping system is similar to the one just described, the only difference being the positioning of the anti-extraction tab 34 which is axially aligned with the lug 32 to be housed in the closed slot 3'B of the tube 1 when it is engaged in the annular space formed between the seal and the collar. It is of course possible to choose to position the lug 34 differently, for example so that it cooperates with one of the lateral slots 3'C.

In the example of FIG. 6, the slot 3" of the tube 1 is still different and in this case has a substantially Y-shaped closed slot 3"B and a V-shaped recess 3"A arranged in the hollow formed between the two branches of the Y-shape, this V-shaped recess being open on the front edge 1'A of the tube 1. In this case, the lug 32 of the seal 20 is formed on the front edge 21A of this seal to be naturally housed in the recess 3"A. The anti-extraction tab 34 is substantially aligned with this lug 32 so as to be housed in an enlarged tail portion of the Y-shape 3"B.

FIGS. 5 and 6 are of course examples showing that it is possible with different configurations to make the tube position key and the anti-extraction member of the seal relative to the tube.

The seal which has just been described is initially stressed towards the inner surface of the belt of the collar. However, the end of the outer tube can be engaged between the inner surface of the belt and the seal, by elastically deforming the seal against its initial stress. Once the insertion has been made, the seal naturally tends to be stressed towards the inner periphery of the external tube then engaged in the collar. Thus, the internal tube can be easily placed, the seal not constituting an obstacle for this installation because it is pressed against the inner surface of the external tube and retained axially relative to the collar. If necessary, the insertion of the end of the external tube between the seal and the belt of the collar can be promoted by the presence of at least one insertion ramp. Particularly when the collar is of the open type, the possible presence of an angular seal key can allow ensuring that the ends of the strip in which the seal is formed are offset relative to the opening of the collar.

It is noted that the belt of the collar and the seal have substantially unchanged diameters from one edge to the other. Thus, the belt of the collar and the seal define cylindrical surfaces. Particularly, they are formed from flat strips wound on themselves.

The invention claimed is:

1. A clamping device comprising a collar which has a belt able to adopt an unclamped state and a clamped state in which a diameter of the belt is reduced compared to the unclamped state, and a seal disposed inside the belt by being retained axially relative to the collar, the seal being formed in a strip, which is wound on itself and whose ends are configured to cooperate together via a sealing arrangement, wherein, in the unclamped state of the belt, the pre-mounted seal disposed inside the belt undergoes a stress towards an inner surface of the belt, the seal being configured to be elastically deformed against said stress to allow the insertion of an annular object between the seal and the belt, the seal having a rear edge which is provided with at least one insertion ramp inclined towards an axis of winding of the strip in a direction moving away axially from the seal from said rear edge, so as to promote insertion of the annular object between the seal and the belt, wherein the seal has a front edge provided with at least one abutment configured to cooperate with a front edge of the belt to retain the seal with respect to a movement in at least one direction relative to the belt and the abutment comprises a lug bent outwardly.

2. The device as claimed in claim 1, wherein the pre-mounted seal is pre-stressed by the presence, around said seal, of the belt in the unclamped state.

3. The device as claimed in claim 2, wherein the stress of the seal towards the inner surface of the belt is caused by the tendency of the strip to adopt a diameter greater than the diameter imposed by the belt in which the seal is disposed while the belt is in the unclamped state.

4. The device as claimed in claim 1, wherein the insertion ramp is formed by a lug whose free end is bent inwardly.

5. The device as claimed in claim 1, comprising an angular seal key configured to determine an angular position of the seal relative to the collar.

6. The device as claimed in claim 1, wherein one of the elements including the belt and the seal has a wedge edge and the other one of the elements including the belt and the seal has a wedge protrusion able to cooperate with the wedge edge to retain the seal with respect to a movement relative to the collar.

7. The device as claimed in claim 1, wherein the belt has a window, said window presenting an edge forming a wedge edge, and the seal has a retaining lug projecting in said window.

8. The device as claimed in claim 1, wherein the sealing arrangement comprises a male/female engagement conformation formed at the ends of the strip forming the seal.

9. The device as claimed in claim 1, wherein the belt and the seal have substantially unchanged diameters from one edge to the other.

10. The device as claimed in claim 1, wherein the collar has clamping lugs, raised radially relative to the belt and able to be moved relative to each other to clamp the collar.

11. A tube clamping assembly, comprising a clamping device and a tube, the clamping device comprising a collar which has a belt able to adopt an unclamped state and a clamped state in which a diameter of the belt is reduced compared to the unclamped state, and a seal disposed inside the belt by being retained axially relative to the collar, the seal being formed in a strip, which is wound on itself and whose ends are configured to cooperate together via a sealing arrangement, wherein, in the unclamped state of the belt, the pre-mounted seal disposed inside the belt undergoes a stress towards an inner surface of the belt, the seal being configured to be elastically deformed against said stress between a first configuration in which the seal is in contact with an inner surface of the belt, and a second configuration in which the tube is inserted between the seal and the belt and in which the seal is stressed against an inner periphery of the tube.

12. The assembly as claimed in claim 11, comprising a tube position key determining an angular position of the tube relative to at least one of the elements comprising the seal and the collar.

13. The assembly as claimed in claim 11, wherein the seal has a tube position key lug which radially protrudes outwardly from the seal and which is configured to be engaged in a slot formed at the end of the tube.

14. The assembly as claimed in claim 11, wherein the seal comprises an anti-extraction member configured to cooperate with a window of the tube to oppose the extraction of the seal from the tube.

15. The assembly as claimed in claim 11, wherein the seal has a rear edge which is provided with at least one insertion ramp inclined towards an axis of winding of the strip in a direction moving away axially from the seal from said rear edge, an end of the tube sliding on said ramp upon insertion of the tube between the seal and the belt.

16. A tube clamping assembly, comprising a clamping device and a tube, the clamping device comprising a collar which has a belt able to adopt an unclamped state and a clamped state in which a diameter of the belt is reduced compared to the unclamped state, and a seal disposed inside the belt by being retained axially relative to the collar, the seal being formed in a strip, which is wound on itself and whose ends are configured to cooperate together via a sealing arrangement, wherein, in the unclamped state of the belt, the pre-mounted seal disposed inside the belt undergoes a stress towards an inner surface of the belt, the seal being configured to be elastically deformed against said stress to allow the insertion of an end of the tube between the seal and the belt, the assembly comprising a tube position key determining an angular position of the tube relative to at least one of the elements comprising the seal and the collar.

17. The assembly as claimed in claim 16, wherein the seal has a tube position key lug which radially protrudes outwardly from the seal and which is configured to be engaged in a slot formed at the end of the tube.

18. A clamping device comprising a collar which has a belt able to adopt an unclamped state and a clamped state in which a diameter of the belt is reduced compared to the unclamped state, and a seal disposed inside the belt by being retained axially relative to the collar, the seal being formed in a strip, which is wound on itself and whose ends are configured to cooperate together via a sealing arrangement, wherein, in the unclamped state of the belt, the pre-mounted seal disposed inside the belt undergoes a stress towards an inner surface of the belt, the seal being configured to be elastically deformed against said stress to allow the insertion of an annular object between the seal and the belt, the seal having a rear edge which is provided with at least one insertion ramp inclined towards an axis of winding of the strip in a direction moving away axially from the seal from said rear edge, so as to promote insertion of the annular object between the seal and the belt, wherein the insertion ramp is formed by a lug whose free end is bent inwardly.

* * * * *